US012593010B2

(12) United States Patent
    Chatterjee et al.

(10) Patent No.: US 12,593,010 B2
(45) Date of Patent: Mar. 31, 2026

(54) COMMUNICATION ASSEMBLY

(71) Applicant: BRIGHTER AL TECHNOLOGIES GMBH, Berlin (DE)

(72) Inventors: Sreenjoy Chatterjee, Berlin (DE); Marian Gläser, Berlin (DE)

(73) Assignee: BRIGHTER AL TECHNOLOGIES GMBH, Berlin (DE)

( * ) Notice: Subject to any disclaimer, the term of this patent is extended or adjusted under 35 U.S.C. 154(b) by 174 days.

(21) Appl. No.: 18/553,799

(22) PCT Filed: Apr. 7, 2022

(86) PCT No.: PCT/EP2022/059341
    § 371 (c)(1),
    (2) Date: Oct. 3, 2023

(87) PCT Pub. No.: WO2022/214629
    PCT Pub. Date: Oct. 13, 2022

(65) Prior Publication Data
    US 2024/0348747 A1      Oct. 17, 2024

(30) Foreign Application Priority Data
    Apr. 8, 2021    (EP) ..................................... 21167468

(51) Int. Cl.
    *H04N 7/15*          (2006.01)
    *G06F 21/62*         (2013.01)
    (Continued)
(52) U.S. Cl.
    CPC ........... *H04N 7/15* (2013.01); *G06F 21/6254* (2013.01); *G06V 20/70* (2022.01); *G06V 40/168* (2022.01); *G06V 40/174* (2022.01)

(58) Field of Classification Search
    CPC .......... H04N 7/15; H04N 7/147; H04N 7/141; H04N 7/157; H04N 7/14; G06V 20/70;
    (Continued)

(56) References Cited

U.S. PATENT DOCUMENTS 10,504,268 B1    12/2019   Huang et al.
2007/0260984 A1*  11/2007  Marks ..................... A63F 13/65
                                                    715/706

(Continued)

OTHER PUBLICATIONS

"International Application Serial No. PCT/EP2022/059341, International Search Report dated Jul. 15, 2022", (Jul. 15, 2022), 6 pgs.

(Continued)

*Primary Examiner* — Yogeshkumar Patel
(74) *Attorney, Agent, or Firm* — Schwegman Lundberg & Woessner, P.A.

(57)        ABSTRACT

A communication method and a communication assembly, comprising a first capturing unit configured to capture video data of a first peer in real-time, wherein the video data of the first peer comprises an identification feature a mimic expression feature; a second capturing unit configured to capture video data of a second peer in real-time; a first anonymization unit configured to modify the video data captured by the first capturing unit in real-time by replacing a characteristic of the identification feature in the video data of the first peer while substantially maintaining a characteristic of the mimic expression feature in the video data of the first peer; a first display unit of the first peer; a second display unit of the second peer; a data transfer unit configured to perform a transfer of the video data.

16 Claims, 6 Drawing Sheets

Figure 1A:
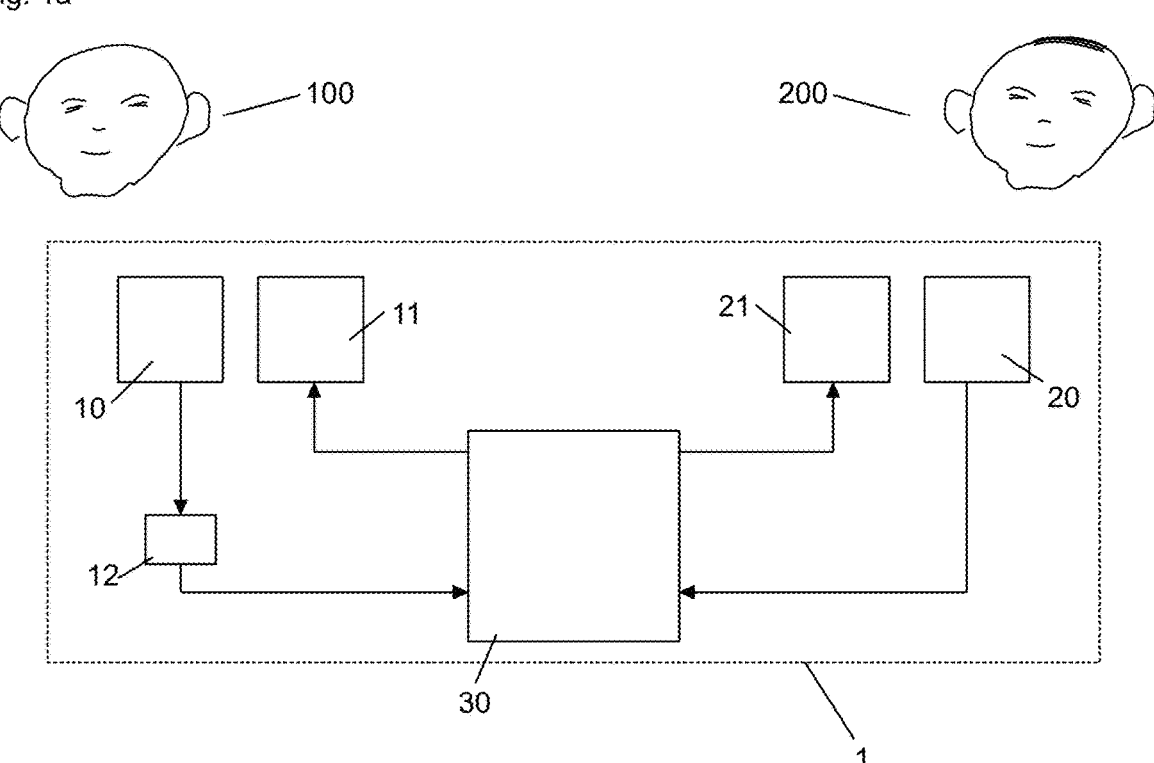

(51) Int. Cl.
*G06V 20/70* (2022.01)
*G06V 40/16* (2022.01)

(58) Field of Classification Search
CPC .... G06V 40/168; G06V 40/16; G06V 40/174;
G06V 40/171; G06V 40/172; G06F
21/6254; G06F 3/011; G06T 13/40; G06T
2207/20036; G06T 2210/44; A63F
2300/5553
See application file for complete search history.

(56) References Cited

U.S. PATENT DOCUMENTS

| | | | | |
|---|---|---|---|---|
| 2015/0213604 | A1 | 7/2015 | Li et al. | |
| 2018/0089880 | A1* | 3/2018 | Garrido | H04N 7/157 |
| 2020/0373002 | A1* | 11/2020 | Kadambi | G16H 30/40 |

OTHER PUBLICATIONS

"International Application Serial No. PCT/EP2022/059341, Written Opinion dated Jul. 15, 2022", (Jul. 15, 2022), 13 pgs.

Chen, Weihua, et al., "Beyond triplet loss: a deep quadruplet network for person re-identification", Proceedings of the IEEE conference on computer vision and pattern recognition, (2017), 403-412.

Deng, Jiankang, et al., "Retinaface: Single-stage dense face localisation in the wild", arXiv preprint arXiv:1905.00641, (2019), 10 pgs.

Feng, Yao, et al., "Learning an animatable detailed 3D face model from in-the-wild images", ACM Transactions on Graphics (ToG) 40.4, (2021), 1-13.

Guo, Jianzhu, et al., "Towards fast, accurate and stable 3d dense face alignment", European Conference on Computer Vision. Cham: Springer International Publishing, (2020), 22 pgs.

Hukkelås, Håkon, et al., "Deepprivacy: A generative adversarial network for face anonymization", International symposium on visual computing. Cham: Springer International Publishing, (Sep. 10, 2019), 14 pgs.

Karras, Tero, et al., "Analyzing and improving the image quality of stylegan", Proceedings of the IEEE/CVF conference on computer vision and pattern recognition, (2020).

Soleymani, Roghayeh, et al., "Progressive boosting for class imbalance and its application to face re-identification", Expert Systems with Applications 101, (2018), 271-291.

Wang, Faqiang, et al., "Joint learning of single-image and cross-image representations for person re-identification", Proceedings of the IEEE conference on computer vision and pattern recognition, (2016), 1288-1296.

* cited by examiner

COMMUNICATION ASSEMBLY

PRIORITY APPLICATIONS

This application is a U.S. National Stage Filing under 35 U.S.C. § 371 from International Application No. PCT/EP2022/059341, filed on Apr. 7, 2022, and published as WO2022/214629 on Oct. 13, 2022, which claims the benefit of priority to European Application No. 21167468.4, filed on Apr. 8, 2021; the benefit of priority of each of which is hereby claimed herein, and which applications and publication are hereby incorporated herein by reference in their entireties.

The present document relates to a communication assembly and to a method of operating the communication assembly. The communication assembly may be a real-time video communication assembly. The communication assembly of the presently proposed type may find application in a communication, in particular a real-time video communication, for example. The real-time video communication may be a video conference.

In the context of a video communication, participants may exchange video data in order to perform the video conference. An advantage of said video conference is the possibility to exchange information, lead discussions and receive feedback at zero travel expenses as well as relatively low costs regarding time and technical efforts. The transfer of real-time video data showing a participant, in particular a face of the participant, allows for receiving emotional feedback from the participant by way of, for example, a mimic expression in the participant's face visible in received video data.

However, due to the nature of the video conference, the transferred video data is vulnerable to breaches and can be compromised. For example, it may be almost impossible for a participant of the video conference to evaluate with certainty whether another participant of the video conference is situated in a safe environment where the transferred information is not involuntarily shared, for example with an illegal intruder. There might also be a situation where at least one of the participants of the communication is considered as possibly not trustworthy by another participant of the communication, for example if there is not enough information about an identity, social and/or professional background of the respective participant. Likewise there might be a situation where at least one of the participants wishes to stay anonymous, for example a witness being questioned by the police or during pastoral care.

Hence, there may arise a need to hide a personal information, in particular an identity of one or more of the participants of the communication. At the same time a wish or even need persists to receive personal feedback by way of a mimic expression of the respective participants.

Currently, simple technologies exist to anonymize a person depicted in video data, that is, to prevent a correct identification of the person from the video data. A possible method of anonymization is, for example, blurring out a face or pixeling an area in the video and/or image data containing information suitable for identifying the respective person. However, in particular in a video conference, such blurring or pixeling may lead to a very poor experience of participants and may even destroy the mimic expression in the video data and hence prevent feedback. It is therefore desirable to provide an improved method to obscure an identity of a participant in the video conference.

The present document discloses a solution to this problem according to the independent claims. Further advantageous aspects are disclosed with the dependent claims.

The presented solution may, for example use recent advances in this field of technology. For example, in the article 'Jiankang Deng, Jia Guo, Yuxiang Zhou, Jinke Yu, Irene Kotsia, Stefanos Zafeiriou: RetinaFace: Single-stage Dense Face Localisation in the Wild. arXiv: 1905.00641, cs.CV, https://dblp.org/rec/journals/corr/abs-1905-00641.bib, 2019' a robust single-stage face detector named RetinaFace is presented, which performs pixel-wise face localisation on various scales of faces by taking advantages of joint extra-supervised and self-supervised multi-task learning. By employing light-weight backbone networks, RetinaFace can run real-time on a single CPU core for a VGAresolution image. The article provides also references to related publications providing even more information.

Another source of information is the article 'Jianzhu Guo, Xiangyu Zhu, Yang Yang, Fan Yang, Zhen Lei, Stan Z. Li: Towards Fast, Accurate and Stable 3D Dense Face Alignment. arXiv: 2009.09960, cs.CV, 2020' and the references therein. In this article a novel regression framework named 3DDFA-V2 which makes a balance among speed, accuracy and stability is proposed.

Furthermore, information on anonymization of faces, for example deep anonymization, may be found in the article 'Yao Feng, Haiwen Feng, Michael J. Black, Timo Bolkart: Learning an Animatable Detailed 3D Face Model from InThe-Wild Images, arXiv: 2012.04012, cs.CV, 2020' where a method is presented to jointly learn a model with animatable detail and a detailed 3D face regressor from in-the-wild images that recovers shape details as well as their relationship to facial expressions. The article provides also references to related publications providing further information.

Further, an article concerned with deep anonymization is 'Håkon Hukkelås, Rudolf Mester, Frank Lindseth: DeepPrivacy: A Generative Adversarial Network for Face Anonymization. arXiv: 1909.04538, cs.CV, https://dblp. org/rec/journals/corr/abs-1909-04538.bib, 2019.' Therein, a novel architecture is proposed which is able to automatically anonymize faces in images while retaining the original data distribution. A total anonymization of all faces in an image by generating images exclusively on privacy-safe information is ensured. The model of the algorithm is based on a conditional generative adversarial network, generating images considering the original pose and image background, wherein the conditional information provides highly realistic faces with a seamless transition between the generated face and the existing background.

More information can also be found in 'Tero Karras, Samuli Laine, Miika Aittala, Janne Hellsten, Jaakko Lehtinen, Timo Aila: Analyzing and Improving the Image Quality of StyleGAN. arXiv: 1912.04958, cs.CV, 2019.' Therein, the authors expose and analyse several artefacts characteristic for style-based generative adversarial network architecture (StyleGAN) and propose changes in both model architecture and training methods to address them. In particular, they redesign the generator normalization, revisit progressive growing, and regularize the generator to encourage good conditioning in the mapping from latent codes to images.

The communication assembly of the present disclosure comprises a first capturing unit configured to capture video data of a first peer in real-time, wherein the first peer corresponds to a first human being. The video data captured by the first capturing unit may include video facial data of the first peer. It is also conceivable that the video facial data of the first peer comprises an identification feature suitable for an identification of the first peer. Furthermore, it is possible that the video facial data of the first peer comprises a mimic expression feature suitable for a non-verbal communication originating from the first peer.

It is appreciated that the communication assembly may, for example, comprise one or more devices, for example communication devices that are configured to provide a means for a communication. Each of the devices may be disposed in a different location. It is, in general, possible that the communication assembly is denoted as a communication device while keeping in mind that such a communication device may comprise more than one device. The communication device may, for example, also be part of a communication system Video data may include, for example, a sequence of images and it may also include sound data. The video data may be encoded, for example, using a video coding method, for example according to a format like H.262, H.264, H.265 or other formats not explicitly listed here.

The identification feature may be used to identify a human being, for example by a human being and/or by a machine. For example, in video facial data, the depicted shape of a nose, a depicted shape of an ear, a depicted shape of a lip, a depicted shape of an eyebrow, a depicted colour of a skin, a depicted colour of a hair, a depicted haircut etc. as well as the arrangement thereof may be the identification feature. The identification feature may correspond to an anatomical feature of a face of a human being, for example the first peer. A characteristic of the identification feature may be, for example, a particular shape of the depicted nose, a particular shape of the depicted ear, a particular shape of the depicted lip, a particular colour of the depicted skin or the like. The identification feature may be represented, for example, by a numerical value and/or a graph and/or an element of a set and/or corresponding video data and/or corresponding image data.

Identifying, that is the process belonging to the identification, may include comparing the characteristic of the identification feature of an, at first, unknown human being, for example depicted in the video data, with a characteristic of the corresponding identification feature of a known human being and/or of video data depicting the known human being. Identifying may also include, for example depending on the outcome of the comparison, assigning an identity of the known human being to the, at first, unknown human being. Identifying may, for example, be performed using an algorithm which may be implemented by means of a computer program. Correctly identifying refers to the assignment of a correct identity to the, at first, unknown human being.

It is appreciated that the identification feature may comprise a plurality of identification features. Identifying may include facial recognition as, for example, realized using a re-identification network or model which is a computer algorithm or computer-based apparatus that is configured to re-identify persons/faces or other objects starting from images or video. A re-identification network can, for example, be based on convolutional neural networks or other machine learning models, which are trained to re-identify persons/faces from images or video data. The input that is fed to this model is typically one or more images, for example video data, or an image patch that contains a face/person. The model output is an identity vector. The identity vector may then represent the identity of a person, for example of a peer. Typically, the identity vector is a fixed-size vector of floating point numbers. So, each element of the identity vector may represent an identification feature and the value of the respective element may represent the characteristic of the respective identification feature. The value of the vector comprises the values of all of its elements. If, in a comparison, a value of an identity vector of a first person is equal or sufficiently close to a value of an identity vector of a second person, then the first and the second person may be considered to have the same identity.

Algorithms concerning the determination of the identity vector and its use for identifying a person may be found, for example, in the following publications:

Soleymani, Roghayeh, Eric Granger, and Giorgio Fumera. "Progressive boosting for class imbalance and its application to face re-identification." Expert Systems with Applications 101 (2018): 271-291.

Chen, Weihua, et al. "Beyond triplet loss: a deep quadruplet network for person re-identification." Proceedings of the IEEE Conference on Computer Vision and Pattern Recognition. 2017.

Wang, Faqiang, et al. "Joint learning of single-image and cross-image representations for person re-identification." Proceedings of the IEEE Conference on Computer Vision and Pattern Recognition. 2016.

The mimic expression feature may be, for example, a depicted pose, a change and/or a sequence of changes of the shape of the depicted nose, the depicted shape of the lip, the depicted shape of the eyebrow and/or an arrangement thereof. The mimic expression feature may have a characteristic, for example a particular depicted pose, a particular change and/or a particular sequence of changes of the depicted shape of the depicted nose, the depicted ear, the depicted lip etc.

It is possible to consider the mimic expression feature as a result of a muscle activity and/or a movement of a human being, for example the first peer, controlled by a neural activity of the first peer. The mimic expression feature may be important in a communication, for example a non-verbal communication, between humans. Based on the mimic expression feature it is possible to transfer, for example, ideas, reactions, and thoughts in a communication. It is furthermore possible, that the mimic expression feature is represented, for example, by a numerical value and/or a graph and/or an element of a set and/or corresponding video data and/or corresponding image data.

The working principle of how to determine the mimic expression feature may be described analogously to the identification feature, wherein the focus is put on facial features that are not used for the identification of a person but on features relevant for communication, in particular non-verbal communication, as described above. It is appreciated that the mimic expression feature may comprise a plurality of mimic expression features. The mimic expression features may be represented by a mimic expression vector. Typically, the mimic expression vector is a fixed-size vector of floating point numbers. So, each element of the mimic expression vector may represent a mimic expression feature and the value of the respective element may represent the characteristic of the respective mimic expression feature. The value of the vector comprises the values of all of its elements.

In addition, the communication assembly may comprise a second capturing unit configured to capture video data of a second peer in real-time, wherein the second peer corresponds to a second human being. The first and/or the second capturing unit may be a camera, for example a webcam, configured to produce video data.

Also, the communication assembly may include a first anonymization unit configured to modify the video data captured by the first capturing unit in real-time by replacing the characteristic of the identification feature in the video data of the first peer with a characteristic of a corresponding identification feature of a first quantized peer to complicate or prevent a correctly identifying of the first peer from the identification feature while substantially maintaining the characteristic of the mimic expression feature in the video data of the first peer. The above described modification of the video data may also be denoted as anonymization. The first anonymization unit may include an anonymization device and/or method as described in the above listed references. The devices and/or methods described therein also provide a means to provide the identification feature and the mimic expression feature from video data, for example video facial data.

Video data of a peer signifies in general that the peer is at least partially depicted in the video data. The term real-time may signify a short time span in the sense of a delay due to processing or transmitting the video data, that is, an at most insignificant processing and/or transmission delay, for example a delay of less than 5 seconds, preferably less than 1 second, more preferably less than 0.5 seconds and most preferably less than 0.1 seconds. In certain cases the delay may also be longer.

Using the identity vector and the mimic expression vector, image and/or video data of the first peer may be projected into a data space. The first quantized peer may be considered as an artificial peer projected into the same data space as the first peer and having corresponding image and/or video data. Therefore, it is possible to define an identity vector and a mimic expression vector of the first quantized peer. Analogously to the identity vector of the first peer, the identity vector of the first quantized peer may include an identification feature of the first quantized peer which may correspond to the identification feature in the video data of the first peer. The identification feature of the first quantized peer may also have a characteristic. The characteristic of the identification feature of first quantized peer may, for example, correspond to a value of the respective element of the identity vector and it may hence also correspond to a coordinate in the data space. For anonymization, the characteristic of the identification feature of the first quantized peer is preferably different from the characteristic of the corresponding identification feature in the video data of the first peer. The first quantized peer may also have a mimic expression feature similar to the mimic expression feature in the video data of the first peer.

In order to modify or even to obscure an identity it may be seen as advantageous to replace the characteristic of the identification feature while, for example, maintaining the mimic expression feature. For example, it may be possible to replace the characteristic of the identification feature in the video data of the first peer by the characteristic of the corresponding identification feature of the first quantized peer. After the replacement, the modified video data of the first peer, that is, the video data modified corresponding to the replaced characteristic of the identification feature, may then depict a human being corresponding, at least with respect to the respective identification feature, to the corresponding image and/or video data of the first quantized peer. It would be possible that the first quantized peer looks like a real human being even if the first quantized peer or an appearance thereof is created completely or in parts artificially, for example by defining the first quantized peer as a point in the data space. However, in the modified video data of the first peer, the mimic expressions may still correspond to the true mimic expressions of the first peer. Therefore, a participant's experience in the video conference may be entirely similar to a participant's experience in a video conference where a real human being is depicted. A conversation in the video conference may hence provide a fully natural experience.

The described way of anonymization may also be denoted as deep natural anonymization. How much the identity vector is changed is dependent which of the identification features should be retained after anonymization and is, therefore, dependent on the application. The minimum requirement for a sufficiently good anonymization is that a human being and/or an algorithm cannot determine the true identity of the peer depicted in the modified, that is anonymized, image and/or video data.

Deep natural anonymization has the advantage of removing privacy infringing details while preserving other, nonprivacy infringing information. For example, in the case of a face, this may mean that the face is modified beyond recognition (by both a human and a facial detection algorithm) while other information such as mimic expression, age, gender, ethnicity are preserved. Data that is modified using deep natural anonymization can also be used for analytics, for example, regarding consumer satisfaction, scientific studies, for example in medical studies, etc. without infringing on the privacy of the depicted individuals.

The communication assembly may also comprise a first display unit of the first peer, wherein the first display unit is configured to receive and to display video data in real-time. It is also possible that the communication assembly includes a second display unit of the second peer, wherein the second display unit is configured to receive and to display video data in real-time. In addition to the description above, real-time may also signify that the delay in the communication is sufficiently short to communicate similar to a conversion of two human beings, for example in a telephone talk. It may be observed that the real-time feature supports the fully natural experience in the video conference.

It is possible that the first display unit displays real-time video data to the first peer in real-time. It is also possible that the second display unit displays real-time video data to the second peer in real-time. The first display unit and/or the second display unit may be, for example, a computer monitor, a screen, a touchscreen or the like.

It is conceivable that the communication assembly includes a data transfer unit configured to perform a transfer of the video data modified by the first anonymization unit to the second display unit. The data transfer unit may comprise a data network, like the internet or a part thereof, for example, and/or a telephone network and/or, more general, a communication network. A direct link between the first capturing unit and the first display unit on one side and the second capturing unit and the second display unit on the other side is also conceivable. In such a case the direct link may be established, for example, with an appropriate cable and/or a radio connection between the one side and the other side.

In an embodiment it is possible that the data transfer unit is further configured to perform a transfer of the video data captured by the second capturing unit to the first display unit.

The data transfer unit may also comprise an appropriate interface to the first and/or the second capturing unit and to the first and/or the second display unit, for example in the form of an interface device like a computer, a smart phone, a tablet computer or another suitable device providing an access to a communication service of the data transfer unit. It is also conceivable that the first capturing unit and/or the first display unit are integrated into said interface device. Likewise it is conceivable that the second capturing unit and/or the second display unit are integrated into said interface device wherein it is possible that there is more than one of said interface devices. It may be appreciated that the disclosed communication assembly may be, for example seamlessly, integrated into an existing communication network providing a communication service.

The disclosed communication assembly may be implemented, for example, as a hardware but may also include a software. It is possible, to re-use already existing hardware and, for example, provide a part of the communication assembly as an additional software component, which may enhance an already existing device, for example said interface device.

The communication assembly may also comprise a first selector configured to provide a means configured to select a portion of the video data, for example a portion of the video data which includes video facial data. Based on the selection, the first anonymization unit may perform a portion specific replacement of the characteristic of the identification feature in the video data of the first peer with the corresponding characteristic of the identification feature of the first quantized peer. The first selector may, for example, be implemented as a unit that allows to select a portion in the video data by marking an area in the video data, wherein the area may be marked according to a geometrical shape like, for example, a polygon, a circle, and/or, for example, according to an attribute of the video data like an intensity or a colour of the area to be marked. A selection may also be performed, for example, in accordance with a certain element of a face depicted in the video data, for example a nose, a mouth, an eye, a chin, an ear and the like. Hence, the first selector may also be configured to provide a means to select a portion in the video data, for example, by selecting from a set of elements of a face.

The advantageous effect of the first selector may be appreciated in a situation where, for example, a portion of the video facial data shall not be anonymized, like, for example, if, in a video conference between a doctor and a patient, a particular portion of the face shall be examined by the doctor. For example, the patient may correspond to the first peer and the doctor may correspond to the second peer. In such a case it may be required to not anonymize the particular portion in the video data of the patient's face, for example the nose or the mouth or the chin or the like. So, for example, if the shape of the nose is the identification feature and the specific shape of the nose is the characteristic of the identification feature, then, if the nose is selected by the first selector to be not anonymized, the specific shape of the nose is not replaced with the specific shape of the nose of the first quantized peer. In general, the first selector may be configured, for example, to either select a portion of the face to be anonymized or a portion of the face to be excluded from anonymization.

It is conceivable that the selection performed by the means of the selector is made only for a certain period of time wherein the period of time may be preset or chosen, for example by the first peer. It may, for example, be possible to change the selection during the transfer of video data, for example during a video conference. The selection may also be switched on or off during a video data transfer. As an option it may be possible that the selector includes a profile about what portions are to be selected for anonymization or for exclusion from anonymization. Such a profile may be configurable, for example by the first peer. Furthermore, it is possible that the first selector is operated by the first peer. It is also possible that the first selector is operated by someone else or by a device, for example by the second peer or a server providing a service, for example via a remote command. It is, for example, conceivable that a server provides a profile, for example related to a kind of service, and commands the first selector to select according to the provided profile.

In an embodiment it is possible that the video data captured by the second capturing unit includes video facial data of the second peer. Furthermore, the video facial data of the second peer may comprise an identification feature suitable for an identification of the second peer and a mimic expression feature suitable for a non-verbal communication originating from the second peer. It is also conceivable that the communication assembly comprises a second anonymization unit configured to modify the video data captured by the second capturing unit in real-time by replacing a characteristic of the identification feature in the video data of the second peer with a characteristic of a corresponding identification feature of a second quantized peer to complicate or prevent a correctly identifying of the second peer from the identification feature while substantially maintaining a characteristic of the mimic expression feature in the video data of the second peer. Furthermore, the data transfer unit may perform a transfer of the video data modified by the second anonymization unit to the first display unit.

In an embodiment, the communication assembly may comprise a second selector configured to provide a means configured to select a portion of the video data of the second peer, for example a portion of the video data which includes video facial data. Based on the selection the first anonymization unit may perform a portion specific modification of the characteristic of the identification feature in the video data of the second peer with the corresponding characteristic of the identification feature of the second quantized peer.

The description of the first peer, the first quantized peer, the first anonymization unit, the identification feature, the mimic expression feature and the first selector related to the first peer apply analogously to the second peer, the second quantized peer, the second anonymization unit, the identification feature, the mimic expression feature and the second selector related to the first peer, respectively.

The advantageous effect connected with the second anonymization unit, for example in view of the first anonymization unit, is that the anonymization may be effectuated in both directions, that is, in a communication direction from the first peer to the second peer and/or from the second peer to the first peer. So, the video data of both communication partners may be anonymized in the video conference.

The communication assembly may further comprise a first control unit configured to provide a first identifier assigned to the first peer, wherein the first identifier is configured to label the video data captured by the first capturing unit. It may hence be possible to relate the video data captured by the first capturing unit to the first peer, for example by using the first identifier. It is also possible that the communication assembly includes a second control unit configured to provide a second identifier assigned to the second peer, wherein the second identifier is configured to label the video data captured by the second capturing unit. It may hence be possible to relate the video data captured by the second capturing unit to the second peer, for example by using the second identifier.

The first control unit and/or the second control unit may include a computer, a microcontroller and FPGA (FPGA: field programmable gate array), an ASIC (ASIC: application specific integrated circuit) or another electronic circuit or any combination thereof. The first control unit and/or the second control unit may also be a part of the above described interface device of the data transfer unit. It may, for example, also be implemented as a software component of such an interface device. In general, the first control unit and/or the second control unit may include more than one physical device that may be disposed in separate locations. Both control units may each comprise a memory, for example to store a program which each of the control units may execute, respectively. The first control unit may, for example, provide a user interface to the first peer. The second control unit may, for example, provide a user interface to the second peer. Each of the control units may, for example via the user interface, allow the respective peer to operate the communication assembly or at least a part thereof, for example the data transfer unit. Each of the user interfaces may, for example, comprise a means to receive an input from the respective peer, for example a key, a lever, a switch, a touchscreen, a language processing device, a gesture recognition device or the like and/or a means to provide an output to the respective peer from the communication assembly, for example based on an optical device like a light emitting diode, an acoustical device like a speaker, an image and/or video data output like a screen, or the like.

It is a further possibility that the first identifier is assigned permanently and/or the second identifier is assigned permanently.

It is possible that, for example, the first identifier is generated by the first control unit, for example when a communication, which may be a video conference, is to be started, for example between the first and the second peer and using the communication assembly. It is also conceivable that, for example, the first identifier is stored in a memory of the first control unit. The first identifier may be retrieved later by the first control unit and be used in another communication using the communication assembly. Likewise it is possible that the first identifier is generated at the beginning of each communication using the communication assembly. The decision whether to generate or to retrieve the first identifier may depend on the communication partner, for example the second peer. For example, it may be seen as advantageous by the first peer to have the same first identifier used in a previous communication if the second peer is exactly the second peer of the previous communication. In such a case the first identifier may be stored in the memory and retrieved later for re-use. It might, however, also be the case that a first identifier is created for a communication, for example, if the second peer relates to a new communication partner, for example a human being connected for the first time and acting as the second peer. The selection whether to create a new first identifier or to use a first identifier of a previous communication may be performed by the first peer using the user interface of the first control unit.

The above description for the first identifier and its use applies analogously to the second identifier.

The described properties of the first and second identifier allow, for example, to build up, in spite of anonymization, a communication history between the first and the second peer. That is, if the first and/or the second identifier is re-used, it will be possible to relate a new communication to the communication partner of the previous communication, even if the communication partner stays anonymous.

It is an option that the communication assembly includes a communication identifier configured to label the video data transferred from the first capturing unit to the second display unit and the video data transferred from the second capturing unit to the first display unit.

In an embodiment it is conceivable, that the communication identifier is provided to a third peer. It is also possible that the third peer collects and/or stores and/or organises and/or analyses the video data labelled with the communication identifier. The advantageous effect linked to this feature may be seen in the fact, that a storage for later access and analysis of communicated information is possible, even though the communication partners, for example the first peer and the second peer, remain anonymous. For example, in the context of a medical data analysis, this feature may hence provide a means to analyse anonymized medical data without compromising data security and risking a later identification of the involved peers. The third peer may, for example, be a computer and/or a server. It may also be a human being.

It is furthermore conceivable that the communication identifier is derived exclusively from the first identifier and the second identifier. For example, it is possible that the communication identifier is a hash value calculated with a hash function, wherein the first identifier and the second identifier may be key values of the hash function. The hash value may be, for example, a numerical value, wherein it is not possible or at least laborious to determine the first identifier and/or the second identifier from the calculated hash value.

The communication assembly may further comprise a first authentication unit configured to authenticate the video data of the first peer. It may also comprise a second authentication unit configured to authenticate video data of the second peer. Authentication relates, in general, to verifying an identity of a communication partner, for example the identity of the first peer and/or the identity of the second peer and providing the authentication result to at least one communication partner, for example the first peer and/or the second peer or, for example, the first control unit and/or the second control unit.

In an embodiment it is possible that the communication assembly comprises a first cryptography unit configured to encrypt video data captured by the first capturing unit and decrypt video data to be displayed by the first display unit. In an embodiment it is also possible that the communication assembly comprises a second cryptography unit configured to encrypt video data captured by the second capturing unit and decrypt video data to be displayed by the second display unit. This feature may prevent an unauthorized interception of the video data during a communication.

The present disclosure also includes a communication method. The communication method may also concern a real-time video communication method. The communication method may, for example, be performed using a communication assembly as described above. The features described with respect to the communication assembly are a hence applicable to the communication method. Vice versa, the features described with respect to the communication method are applicable to the communication assembly.

The communication method comprises the steps capturing, by a first capturing unit, video data of a first peer in real-time;

capturing, by a second capturing unit, video data of a second peer in real-time;

modifying the video data captured by the first capturing unit by replacing a characteristic of an identification feature in the video data of the first peer with a characteristic of a corresponding identification feature of a first quantized peer to complicate or prevent a correctly identifying of the first peer from the identification feature while substantially maintaining a characteristic of a mimic expression feature in the video data of the first peer;

performing a transfer of modified video data captured by the first capturing unit to a second display unit;

performing a transfer of video data captured by the second capturing unit to a first display unit.

In an embodiment the communication method may also comprise the step assigning a first identifier to the first peer and labelling with the first identifier the video data captured by the first capturing unit.

The communication method may also include the step assigning a second identifier to the second peer and labelling with the second identifier the video data captured by the second capturing unit.

It is as well conceivable that the communication method comprises one or two of the steps deriving a communication identifier from the first identifier and the second identifier, providing the communication identifier to a third peer, providing the video data transferred from the first capturing unit to the second display unit and the video data transferred from the second capturing unit to the first display unit to the third peer, labelling with the communication identifier the video data transferred from the first capturing unit to the second display unit and the video data transferred from the second capturing unit to the first display unit and, by the third peer, collecting and/or storing and/or organising and/or analysing the video data labelled with the communication identifier;

modifying the video data captured by the second capturing unit by replacing a characteristic of an identification feature in the video data of the second peer with a characteristic of a corresponding identification feature of a second quantized peer to complicate or prevent a correctly identifying of the second peer from the identification feature while substantially maintaining a characteristic of a mimic expression feature in the video data of the second peer and transferring the modified video data captured by the second capturing unit to the first display unit.

As an option it is possible that the communication method comprises one or two of the steps selecting a portion of the video data of the first peer captured by the first capturing unit and performing a portion specific replacement of the characteristic of an identification feature in the video data of the first peer with the corresponding characteristic of the identification feature of the first quantized peer;

selecting a portion of the video data of the second peer captured by the second capturing unit and performing a portion specific replacement of the characteristic of an identification feature in the video data of the second peer with the corresponding characteristic of the identification feature of the second quantized peer.

In an embodiment it is also possible that the communication method comprises one or two of the steps making the assignment of the first identifier permanent;

making the assignment of the second identifier permanent.

It is also conceivable that the communication method comprises one or two of the steps authenticating the video data of the first peer;

authenticating the video data of the second peer.

Also, as an option, the communication method may comprise one or two of the steps encrypting video data captured by the first and/or second capturing unit;

decrypting video data to be displayed by the first display unit and/or the second display unit.

It is furthermore possible that the communication assembly is included in a communication system for audio-visual communication. In that case it is possible to obscure an identity of one or more participants in a communication using the communication system by anonymizing video data of one or more of the participants in real-time.

A possible application of the communication assembly and method may be seen in health care where a strict doctor-patient confidentiality is required to protect an identity of a patient. This level of safeguarding works perfectly for in-person visits. In the context of virtual care, the vulnerability of data during a video conference may be significantly reduced by the proposed device and method.

A similar example may be seen in the context of legal affairs where participants in a video conference may feel more comfortable not revealing true identities and where the proposed device and method provide a solution.

Even for attending virtual social events, where turning off the camera is actually more harmful since it can be considered anti-social, the proposed device and method may provide a solution to protect an identity in a socially compliant manner.

With the proposed solution it is hence possible to enable the seamless experience of social interaction in virtual environments, without compromising on the true identities of the participants.

The proposed solution may also act as another layer on an existing video conferencing tool. It may allow a user to choose whether to attend the video conference with a true identity or an anonymized identity.

An advantage of the device and method of the present disclosure is that, in a video communication, real faces depicted in the video data may be replaced by synthetic faces by means of the described anonymization which may be denoted as natural anonymization. It is conceivable to define a sufficient degree of anonymization when a human being and/or an algorithm is not able to determine the true identity of an individual depicted in the image and/or video data. The degree of anonymization may, for example, be measured with a distance between the identity vector of a peer and a quantized peer, wherein the distance may be determined, for example, with an Euclidian distance or a Mahalanobis distance between the respective identity vectors. Natural anonymization ensures that the user experience still feels the same compared to a conventional video conference, except that true identities are protected. Hereby the solution does not remove facial data or parts thereof but rather generates an artificial face or a part of an artificial face and hence an artificial identity which may be consistent with features of the original identity. It is possible, for example, to maintain features like gender, ethnicity, age, emotion as desired. It is, however also possible to change even these features, if desired.

Figure 1B:
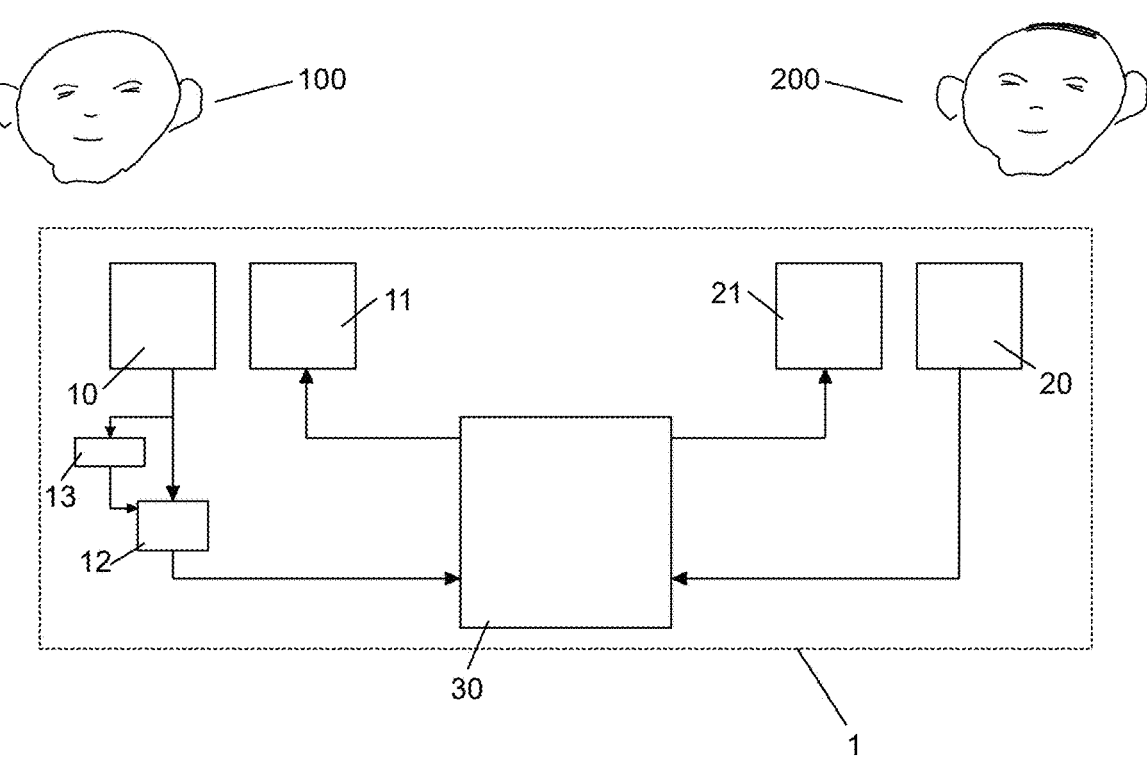
Figure 2A:
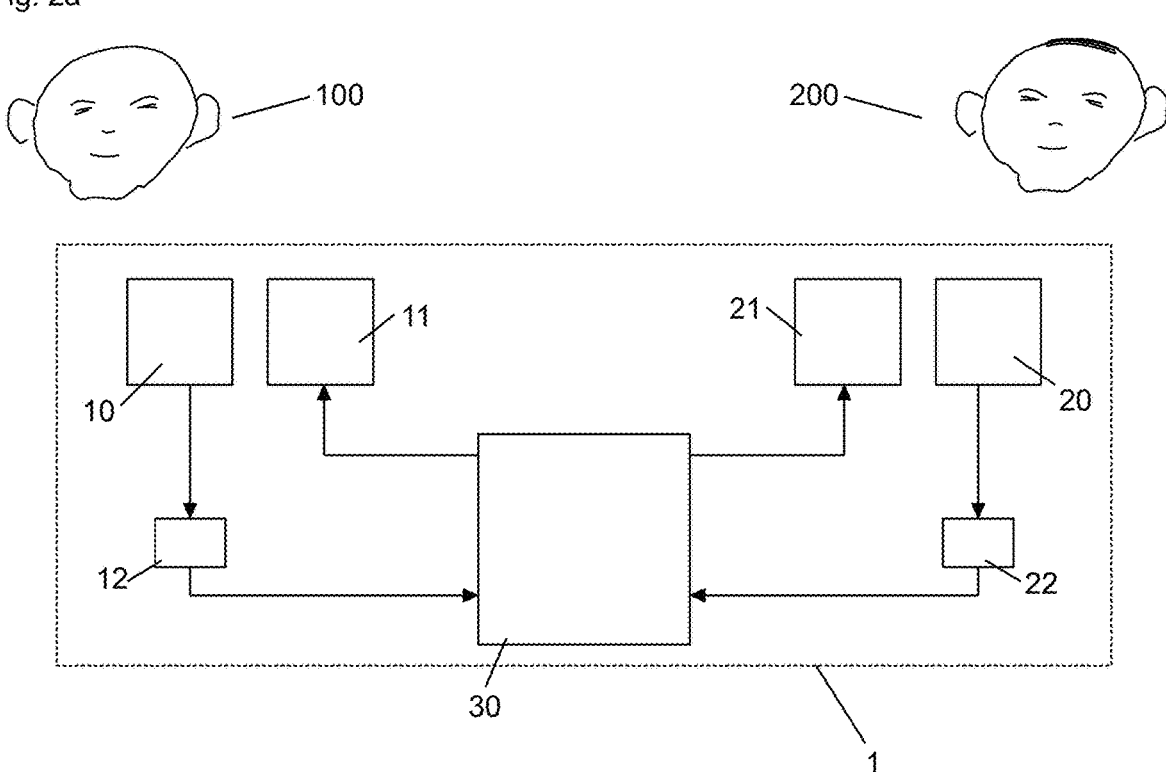
Figure 2B:
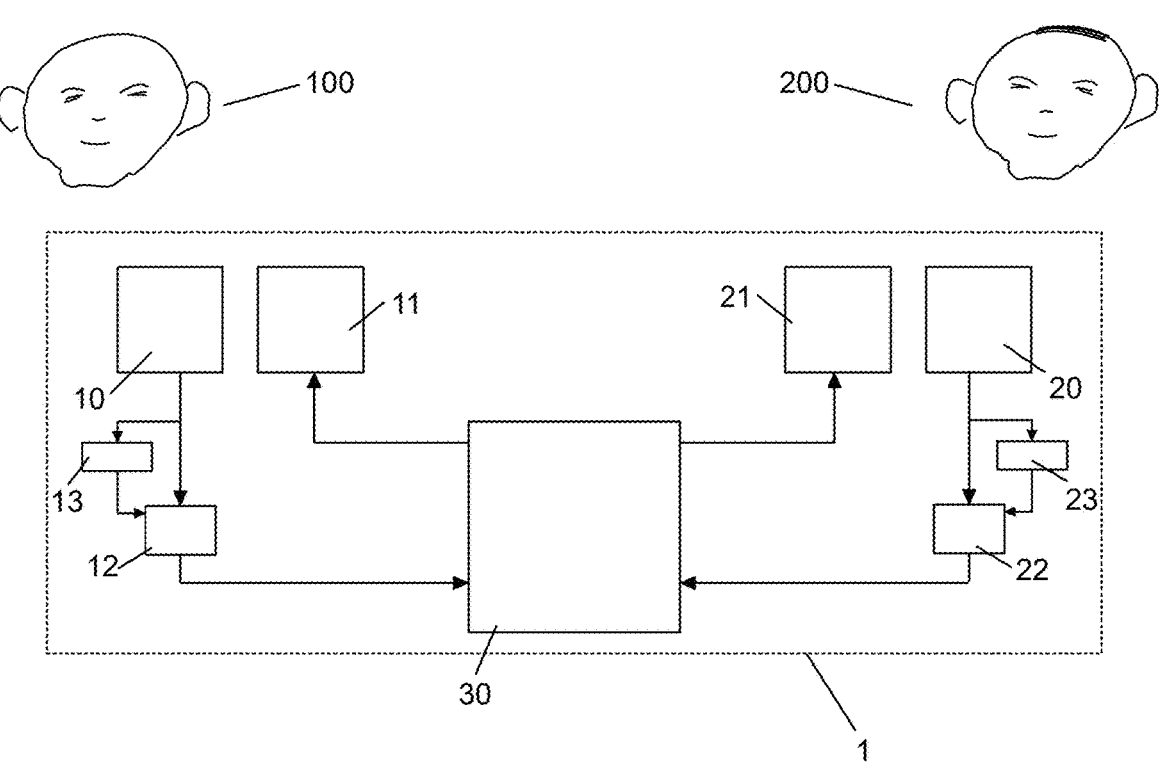
Figure 3A:
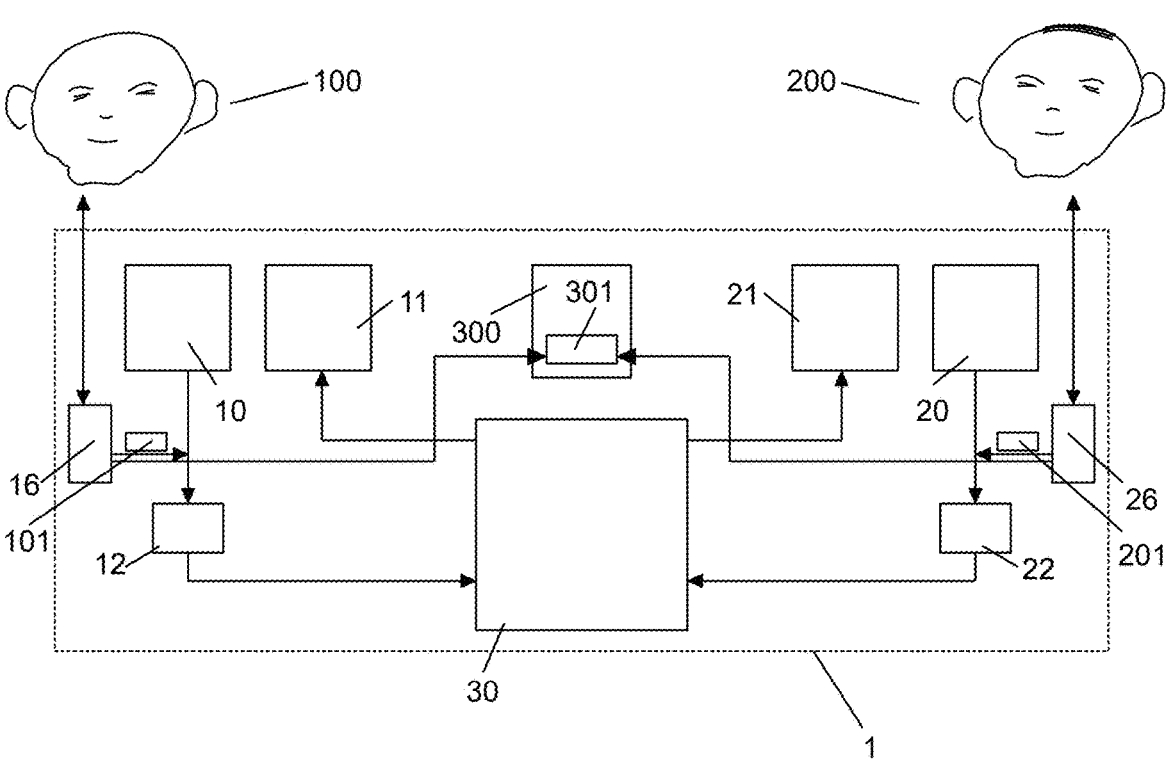
Figure 3B:
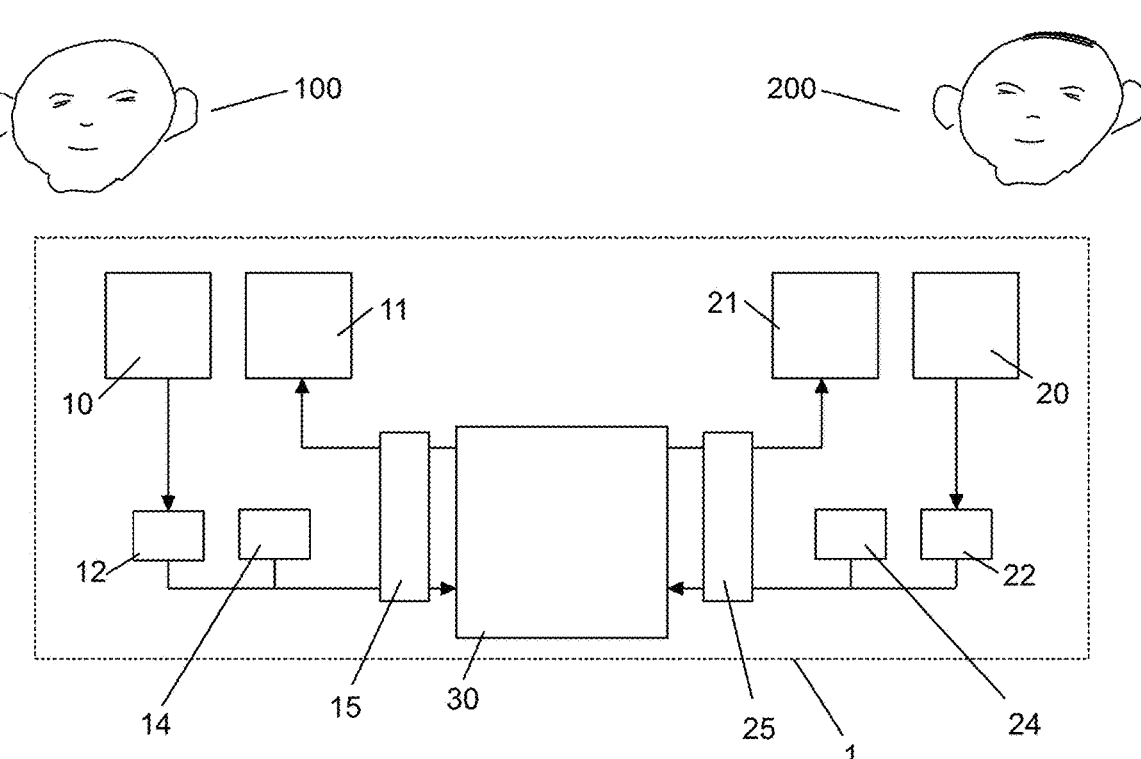
Figure 4A:
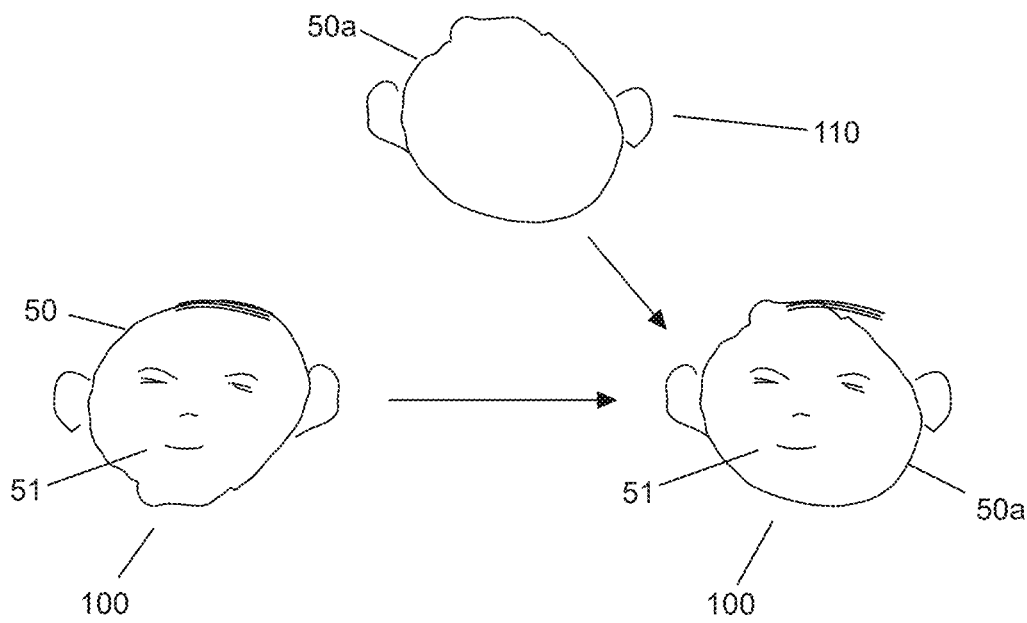
Figure 4B:
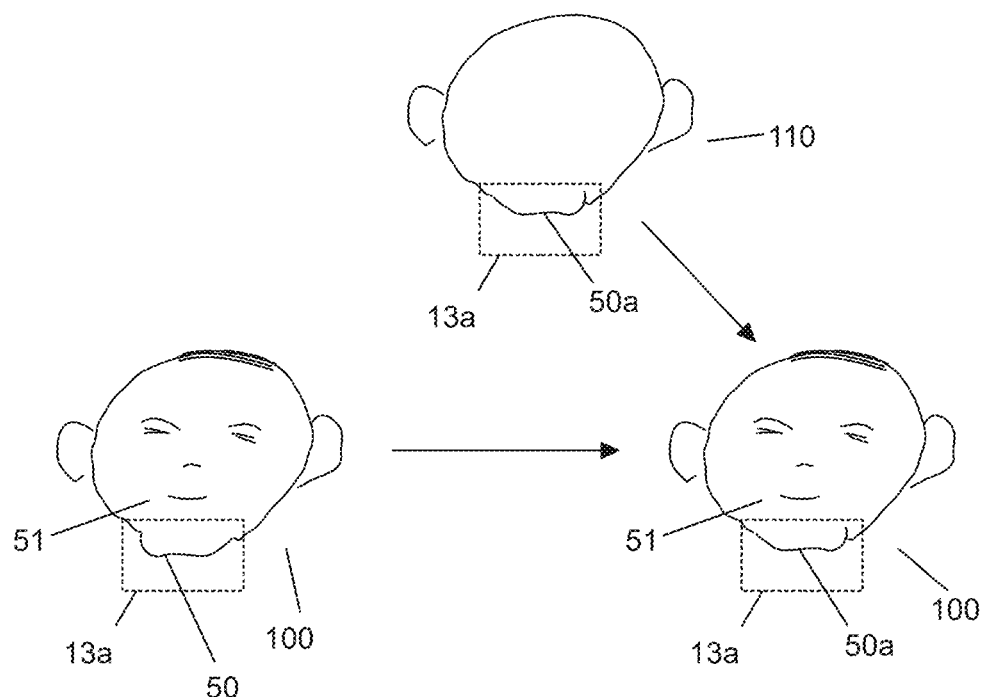
Figure 5:
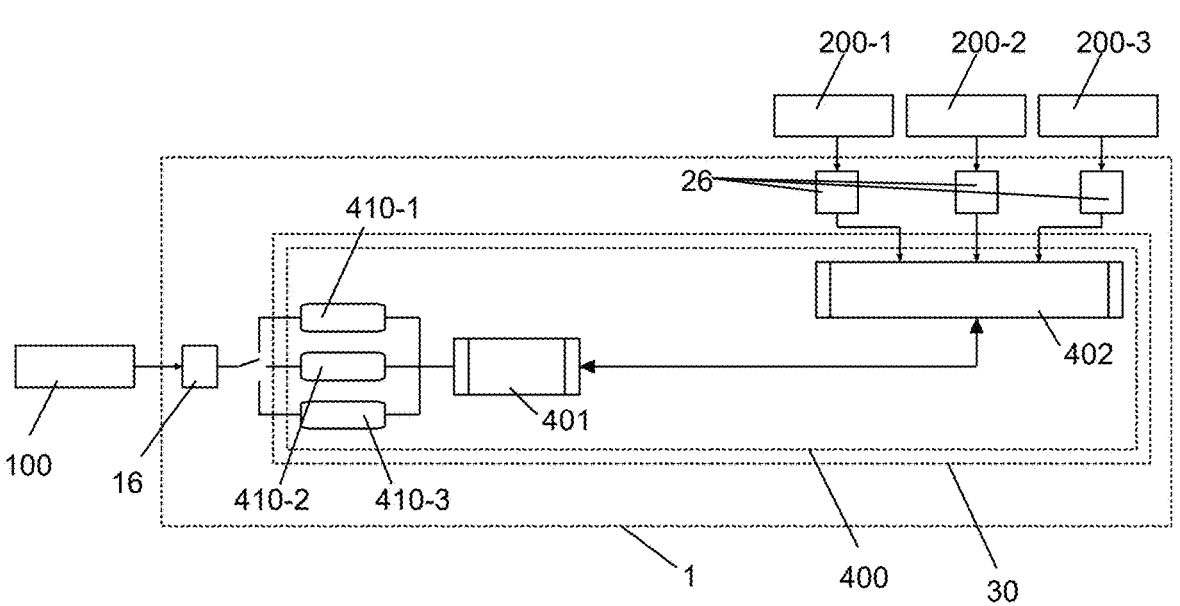
Figure 6:
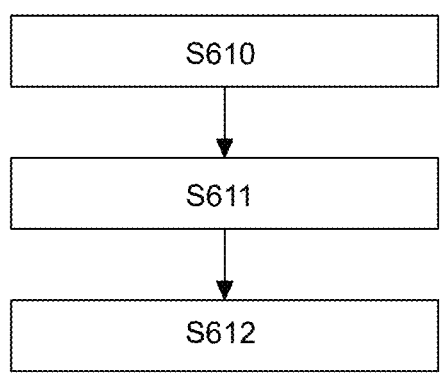
Figure 6:
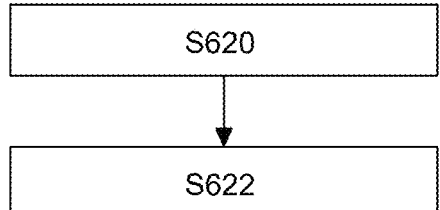

The Figures described herein illustrate embodiments of the presently disclosed subject matter, and are illustrative of selected principles and teachings of the present disclosure. In the Figures:

FIG. 1a: schematically shows an embodiment of a communication assembly;

FIG. 1b: schematically shows the communication assembly of FIG. 1a including a first selector;

FIG. 2a: schematically shows the communication assembly of FIG. 1a including a second anonymization unit;

FIG. 2*b*: schematically shows the communication assembly of FIG. 2*a* including a first and a second selector;

FIG. 3*a*: schematically shows the communication assembly including a third peer and a control unit;

FIG. 3*b*: schematically shows the communication assembly including an authentication unit and a cryptography unit;

FIG. 4*a*: schematically illustrates an anonymization;

FIG. 4*b*: schematically shows a functionality of the first selector;

FIG. 5: schematically shows the communication assembly including a server;

FIG. 6: shows a control flow diagram of a method to operate a communication assembly.

Recurring features in the Figures are provided with identical reference numerals. They may be partially omitted when these features are not referenced in the context of a Figure description.

FIG. 1*a* schematically shows an embodiment of a communication assembly 1. The communication assembly 1 comprises a first capturing unit 10 and a first display unit 11, a second capturing unit 20 and a second display unit 21. The first display unit 11 and/or the second display unit 21 may be, for example, a computer monitor, a screen, a touchscreen or the like. Furthermore, the communication assembly 1 includes a data transfer unit 30 and a first anonymization unit 12. FIG. 1*a* also depicts a first peer 100 and a second peer 200, wherein the first and the second peer 100, 200 each correspond to a human being. The first and/or the second capturing unit 10, 20 may be a camera, for example a webcam, configured to produce video data.

It is assumed that the first and the second capturing unit 10, 20 are disposed in a manner where it is possible for the first capturing unit 10 to produce video data of the first peer 100 and where it is possible for the second capturing unit 20 to produce video data of the second peer 200. It is then further assumed that the video data captured by the first capturing unit 10 includes video facial data of the first peer 100. Similarly, it is assumed that the video data captured by the second capturing unit 20 includes video facial data of the second peer 200. Generally, the video data includes a sequence of images and it may also include sound data. The video data may be encoded, for example using a video coding method, for example according to a format like H.262, H.264, H.265 or other formats not explicitly listed here.

The video data captured by the first capturing unit 10 is transferred via the data transfer unit 30 to the second display unit 21. The video data captured by the second capturing unit 20 is transferred via the data transfer unit 30 to the first display unit 11. The data transfer unit 30 may comprise any means to transfer data, for example a data network like the internet or a part thereof and/or a telephone network and/or, more general, a communication network. The data transfer unit may also comprise any other technology to transfer data, in particular video data, like a radio connection, for example a Wi-Fi connection or a Wi-Fi network and/or a mobile phone connection. The data transfer unit 30 may also include related access technologies, for example a computer including a network interface or, for example, a mobile phone or the like.

A direct link between the first capturing unit 10 and the first display unit 11 on one side and the second capturing unit 20 and the second display unit 21 on another side is also conceivable. In such a case the direct link may be established, for example, with an appropriate cable and/or a radio connection between the one side and the other side.

The facial data, for example of the first peer 100 and/or the second peer 200, may include an identification feature 50 (shown in FIG. 4 and described below), such as, for example, in the video data, a shape of a depicted nose, a shape of a depicted ear, a shape of a depicted lip, a shape of a depicted eyebrow, a colour of a depicted skin, a colour of a depicted hair, a depicted haircut etc. as well as the arrangement thereof. The identification feature 50 may have a characteristic, for example a particular shape of the depicted nose, a particular shape of the depicted ear, a particular shape of the depicted lip, a particular colour of the depicted skin etc. It is possible that the identification feature 50 corresponds to an anatomical feature of the first and/or the second peer 100, 200.

The identification feature 50 may be used to identify a human being, for example by a human being and/or by a machine. Identifying may include comparing the characteristic of the identification feature 50 of an, at first, unknown human being with a characteristic of the corresponding identification feature 50 of a known human being. Identifying may also include, for example depending on the outcome of the comparison, assigning an identity of the known human being to the, at first, unknown human being. Identifying may, for example, be performed using an algorithm which may be implemented by means of a computer program. Furthermore, identifying may use sensorial data, for example video data, in particular video facial data as, for example, captured by a capturing unit like the first capturing unit 10 and/or the second capturing unit 20.

The identification feature 50 may be represented, for example, by a numerical value and/or a graph and/or an element of a set and/or corresponding video data and/or corresponding image data.

The facial data, for example of the first peer 100 and/or the second peer 200, may include a mimic expression feature 51, such as, for example, a depicted pose, a change and/or a sequence of changes of the shape of the depicted nose, the shape of the depicted lip, the shape of the depicted eyebrow and/or an arrangement thereof. The mimic expression feature 51 may have a characteristic, for example a particular depicted pose, a particular change and/or sequence of changes of the shape of the depicted nose, the depicted ear, the depicted lip etc.

The mimic expression feature 51 may be a result of a muscle activity of the peer 100, 200 or a movement of the peer 100, 200. The mimic expression feature 51 may be important in a communication, for example a non-verbal communication, between humans, for example the first peer 100 and the second peer 200. Based on the mimic expression feature 51 it is possible to transfer, for example, ideas, reactions, and thoughts in a communication.

The mimic expression feature 51 may be represented, for example, by a numerical value and/or a graph and/or an element of a set and/or corresponding video data and/or corresponding image data.

The mimic expression feature 51 may be interpreted by a human being and/or by a machine, for example a machine using an algorithm. Interpreting the mimic expression feature 51, for example assigning a sense to the corresponding mimic expression, may, for example, be performed using an algorithm which may be implemented by means of a computer program. Furthermore, the interpretation method may use sensorial data, for example video data, in particular video facial data as, for example, captured by a capturing unit like the first capturing unit 10 and/or the second capturing unit 20.

The first anonymization unit 12 in FIG. 1*a* is configured to perform a modification of the video data captured by the first capturing unit 10. This modification may be performed in real-time, that is, immediately after capturing the video data without a significant delay, for example a delay of less than 5 seconds, preferably less than 1 second, more preferably less than 0.5 seconds and most preferably less than 0.1 seconds. The modification of the video data may include replacing, in the video data, the characteristic of the identification feature 50 in the video data of the first peer with the characteristic of a corresponding identification feature 50*a* of a first quantized peer 110.

Using the identity vector and the mimic expression vector, image and/or video data of the first peer 100 may be projected into a data space. The first quantized peer 110 may be considered as an artificial peer projected into the same data space as the first peer 100 and having corresponding image and/or video data. Therefore, it is possible to define an identity vector and a mimic expression vector of the first quantized peer 110. Then, the first quantized peer 110 has an identification feature 50*a* corresponding to the identification feature 50 in the video data of the first peer 100 and a characteristic of the identification feature 50*a* similar, but in general not equal, to the characteristic of the identification feature 50 in the video data of the first peer 100. The first quantized peer 110 may also have a mimic expression feature 51 similar to the mimic expression feature 51 in the video data of the first peer 100.

The first anonymization unit 12 may find the identification feature 50 and determine the characteristic of the identification feature 50 in the video data of the first peer 100 and replace the characteristic of the identification feature 50 in the video data of the first peer 100 by the corresponding characteristic of the identification feature 50*a* of the first quantized peer 110. In particular, if the characteristic of the identification feature 50 is different from the characteristic of the identification feature 50*a*, it is possible, that, after replacing the characteristic, the identification of the first peer 100 from the video data of the first peer 100 on the basis of the characteristic of the identification feature 50*a* is more difficult or even not feasible. The replacement may be done, for example, by first determining the characteristic of the identification feature 50, replacing the characteristic of the identification feature 50 with the characteristic of the corresponding identification feature 50*a* of the first quantized peer 110, and determining video data corresponding to the replaced characteristic and correspondingly modifying the video data of the first peer 100. The described tasks and steps related to the modification of the video data by the first anonymization unit 12 may be denoted as anonymization.

An algorithm for performing the operation of the first anonymization unit 12 may be found in the references cited above and references thereof.

The method of replacing a real face depicted in the video data by a synthetic face having a different characteristic of the identification feature while maintaining the mimic expression feature by means as described above may also be denoted as natural anonymization. This ensures that the experience still feels the same compared to a conventional video conference, except that true identities are protected. Hereby the solution does not remove facial data or parts thereof but rather generates an artificial face and hence an artificial identity which may be consistent with features of the original identity. It is possible, for example, to maintain features like gender, ethnicity, age, emotion as desired. It is, however also possible to change even these features, if desired.

Based on this functionality it is possible to modify the video data of the first peer 100 in such a way that, for example, age, gender, physical appearance including skin, hair, arrangement of, for example, eyes, nose, mouth, chin, cheeks etc. are modified to prevent the identification of the first peer 100 from the video data.

FIG. 1*b* is similar to the FIG. 1*a*, except for a first selector 13. The first selector 13 receives video data from the first capturing unit 10 and provides a control signal to the first anonymization unit 12. The first selector 13 provides a means to select a portion of the video data of the first peer 100. The means may be a user interface allowing to select a portion of the video data of the first peer 100. The means may also be a computer algorithm capable of determining a portion of the video data according to a selection criterion. The selection criterion may be pre-defined or, for example, provided by a user. The selection criterion may concern, for example, an anatomical portion of the first peer 100 as depicted in the video data captured by the first capturing unit 10, for example the nose, the eyebrow, the eye, the ear etc. The selection criterion may also concern a non-anatomical feature, for example, a colour, a device, like glasses, for example, or a portion of the video, for example a rectangle in a corner of the video or the like. The selected video data and/or an information what portion of the video data is selected may be passed by the first selector 13 to the first anonymization unit 12. Further, the anonymization unit 12 may be commanded, for example by a user and/or by a control unit 16 (not depicted in FIG. 1*b*), how to proceed with the selected video data. For example, the anonymization unit 12 may be commanded to not modify or modify only the selected video data, and/or, for example, to not modify or modify only the non-selected video data.

FIG. 2*a* is similar to FIG. 1*a*, but including a second anonymization unit 22. The description of the first anonymization unit 12 applies in general to the second anonymization unit 22, except that the second anonymization unit 22 is configured to anonymize video data of the second peer 200 captured by the second capturing unit 21 instead of anonymizing the video data of the first peer 100. In comparison to FIG. 1*a*, in FIG. 2*a* a transmission of both, anonymized video data of the first peer 100 and anonymized video data of the second peer 200 is illustrated.

Similarly to the FIG. 1*b* and based on the FIG. 2*a*, FIG. 2*b* further includes a second selector 23 which has a functionality corresponding to the functionality of the first selector 13, but intended for use in combination with the video data captured by the second capturing unit 20.

FIG. 3*a* is similar to the FIGS. 1*a*, 1*b*, 2*a* and 2*b* and shows schematically the communication assembly 1 including a third peer 300 and a first control unit 16 and a second control unit 26. Some of the elements shown in the FIGS. 1*a*, 1*b*, 2*a* and/or 2*b* are omitted in FIG. 3*a* to maintain the clarity of the illustration but may be added to FIG. 3*a* as well. The functionality and implementation of the first control unit 16 and the second control unit 26 may be similar but may also comprise distinguishing features. The subsequent description is given for the first control unit 16 but applies analogously to the second control unit 26.

The first control unit 16 may be a computer, a microcontroller and FPGA (FPGA: field programmable gate array), an ASIC (ASIC: application specific integrated circuit) or another electronic circuit or any combination thereof. In general, the first control unit 16 may include more than one physical device that may be disposed in separate locations. The first control unit 16 may also comprise a memory, for example to store a program which the first control unit 16 may execute and/or data, for example regarding a configuration of a communication and/or the first capturing unit 10 and/or the first display unit 11. It may provide a user interface, for example between the first peer 100 and the communication assembly 1. The user interface allows a user to operate at least a part of the communication assembly 1, for example by providing a means to provide a user input to the communication assembly 1, for example based on a key, a lever, a switch, a touchscreen, a language processing device, a gesture recognition device or the like and/or a means to provide an output to the user from the communication assembly 1, for example based on optical, acoustical, image, video data or the like.

Furthermore, the first control unit 16 allows for, at least partially, an operation of the communication assembly 1. For example, it may establish and/or control the communication between the first peer 100 and the second peer 200, for example by managing a communication connection to and/or via the data transfer unit 30. The first control unit 16 is also configured to provide a first identifier 101.

The first identifier 101 may be used to identify, similar to a name, the first peer 100. The first identifier 101 may be used to label video data produced by the first capturing unit 10, in particular, when video data including facial data of the first peer 100 is captured. It is possible that the first identifier 101 is transmitted together with the video data captured by the first capturing unit 10 such that a recipient of the video data may relate the received video data to the first peer 100. The first identifier 101 may be generated by the first control unit 16, stored, for example in a memory of the first control unit 16, by the first control unit 16 and also retrieved from the memory by the first control unit 16. It is possible that the first identifier 101 is generated at the beginning of a communication. It is also possible that a first identifier 101 of a previous communication is retrieved from the memory of the first control unit 16 and re-used in a present communication. The decision whether to generate or to retrieve the first identifier 101 may depend on the communication partner, for example the second peer 200. For example, it may be seen as advantageous by the first peer 100 to have the very same first identifier 101 if peer 200 is exactly the same person. In such a case the first identifier 101 may be stored in the memory and retrieved later for re-use. It might, however, also be the case that a first identifier 101 is newly created for a communication, for example, if the second peer 200 relates to a new communication partner, for example a human being connected for the first time. The selection whether to create a new first identifier 101 or to use a first identifier 101 of a previous communication may be performed by the first peer 100 using a user interface of the first control unit 16.

The features and options described for the first control unit 16 and the first identifier 101 apply in an analogue manner to the second control unit 26 and the second identifier 201, respectively.

In FIG. 3a, a communication identifier 301 is depicted. The communication identifier 301 may be used to label the video data transferred from the first capturing unit 10 to the second display unit 21 and/or the video data transferred from the second capturing unit 20 to the first display unit 11. As an option, the communication identifier 301 may be derived from the first identifier 101 and the second identifier 201, for example using a hash function. The hash function may calculate a hash value, for example a numerical value, from the first identifier 101 and the second identifier 201, wherein it is not possible or at least laborious to determine the first identifier 101 and/or the second identifier 201 from the calculated hash value. The communication identifier 301 may be derived, for example, by the first control unit 16 and/or the second control unit 26.

The communication identifier 301 may be useful when the video data is to be stored and evaluated, for example by a third peer 300 as depicted in FIG. 3a. The third peer 300 may be a computer and/or a computer network configured to collect and/or to store and/or to organise and/or to analyse the video data labelled with the communication identifier 301. The third peer 300 may include a memory, configured to save video data and the communication identifier 301. The communication identifier 301 may be provided to the third peer 300 by the first control unit 16 and/or the second control unit 26.

FIG. 3b is similar to the FIGS. 1a, 1b, 2a, 2b and 3a and shows schematically the communication assembly 1 including a first authentication unit 14 and a second authentication unit 24. Some of the elements shown in the FIGS. 1a, 1b, 2a, 2b and/or 3a are omitted in FIG. 3b to maintain the clarity of the illustration but may be added to the FIG. 3b as well.

The first authentication unit 14 is configured to authenticate the video data of the first peer 100 and the second authentication unit 24 is configured to authenticate video data of the second peer 200. Authentication relates, in general, to verifying an identity of a communication partner, for example the identity of the first peer 100 and/or the identity of the second peer 200 and providing the authentication result to at least one communication partner, for example the first peer 100 and/or the second peer 200 or, for example, the first control unit 16 and/or the second control unit 26.

For the authentication it may be required, for example by the first peer 100 and/or the second peer 200 and/or, for example, by the first control unit 16 and/or the second control unit 26, to provide a knowledge factor and/or an ownership factor and/or an inference factor. Based thereon, the first and/or the second authentication unit 14, 24 may authenticate the transmitted video data, that is, verify that the video data captured by the first capturing unit 10 comprises video data of the first peer 100 and/or verify that the video data captured by the second capturing unit 20 comprises video data of the second peer 200. The respective control units 16, 26 may provide a user interface to the respective peer 100, 200 in order to provide, for example, the respective knowledge factor and/or the respective ownership factor and/or the respective inference factor.

FIG. 3b also depicts schematically a first cryptography unit 15 and a second cryptography unit 25. The first cryptography unit 15 is configured to encrypt video data captured by the first capturing unit 10 and decrypt video data to be displayed by the first display unit 11 and the second cryptography unit 25 is configured to encrypt video data captured by the second capturing unit 20 and decrypt video data to be displayed by the second display unit 21.

FIG. 4a illustrates schematically an anonymization of the video data of the first peer 100 as an example which applies analogously to the anonymization of the video data of the second peer 200. The exemplary anonymization described here may hence be implemented in the first anonymization unit 12 and/or the second anonymization unit 22. As described above, the video data of the first peer 100 comprises the identification feature 50 having a characteristic. In the FIG. 4a the characteristic of the identification feature 50 in the video data of the first peer 100, depicted in the left part of the FIG. 4a, is different from the characteristic of the identification feature 50a of the first quantized peer 110, depicted in the upper part of the FIG. 4a. The result of the anonymization is shown in the right part of the FIG. 4*a*: the characteristic of the identification feature 50 in the video data of the first peer 100 is replaced by the characteristic of the identification feature 50*a* of the first quantized peer 110. However, the mimic expression feature 51 is the same in the video data of the first peer 100 (left part of the Figure) and in the modified, that is anonymized video data of the first peer 100 (right part of the Figure), wherein, in the example in FIG. 4*a*, the mimic expression feature 51 is represented by a specific orientation and particular shape of the eyes, the eyebrows, the nose and the mouth and their arrangement with respect to each other within the video facial data.

FIG. 4*b* shows schematically, similarly to the FIG. 4*a*, a functionality of the first selector 13 as an example which applies analogously to the second peer 200 and the second quantized peer 210 and the second selector 23 and the second control unit 26. The identification feature 50 in the video data of the first peer 100 is selected using the first selector 13 which allows, in the depicted case, to mark a rectangular region 13*a* of the video facial data of the first peer 100. Similarly as described for FIG. 4*a*, the characteristic of the identification feature 50 in the video data of the first peer 100 is replaced by the characteristic of the corresponding identification feature 50*a* of the first quantized peer 110. In contrast to FIG. 4*a*, the identification feature 50 concerns only the region of the video data inside the rectangular region 13*a* selected with the first selector 13. It is possible that the first peer 100 uses the first selector 13 to select the rectangular region 13*a* as depicted in FIG. 4*b*. It is also possible, for example, that the first control unit 16 performs the selection using the functionality of the first selector 13, for example according to a geometrical shape like, for example, a polygon, a circle, and/or, for example, according to an attribute of the video data like an intensity or a colour of the area to be marked.

It may also be possible that the user performs the selection by, for example, selecting from a set, for example a set of facial elements like a nose, an eye, a chin, a cheek etc. The selection may be performed by, for example, choosing from a list of facial elements and/or features which may, for example be used as the identification feature 50, and/or pointing to the facial element using a graphical interface. The first selector 13 may, for example, be provided by the first control unit 16.

FIG. 5 shows the communication assembly 1 including a server 400. In FIG. 5 mainly elements are shown that are provided to control the operation of the communication assembly 1. Other parts that are not referred to, for example some of the details shown in the FIGS. 1*a*, 1*b*, 2*a*, 2*b*, 3*a*, 3*b*, are omitted to improve clarity but could be readily added. The server 400 may be a part of the data transfer unit 30 and may, for example, be disposed as a part of the internet. FIG. 5 also illustrates a possible application scenario.

As depicted in FIG. 5, the second peer 200 may, for example, comprise three second peers 200-1, 200-2 and 200-3. The three second peers 200-1, 200-2 and 200-3 may, for example, be different from each other. It is conceivable that each of the second peers 200-1, 200-2 and 200-3 provides a service 410-1, 410-2 and 410-3, respectively.

For the first peer 100 it is possible to connect to each of the services 410-1, 410-2 and 410-3. It may be possible for the first peer 100, for example, to select one out of the services 410-1, 410-2 and 410-3. The services 410-1, 410-2 and 410-3 and a method for a selection thereof may be provided via an internet website. Furthermore, the first control unit 16 may provide an interface for the first peer

100, for example via the user interface, to access the website and execute a corresponding selection. Depending on the selection, the control unit 16 may, for establishing a communication, connect, for example in cooperation with the data transfer unit 30, which may include the server 400, to the second control unit 26 of the corresponding peer 200-1, 200-2 or 200-3 providing the selected service 410-1, 410-2 or 410-3, respectively.

The server 400 may provide a first client interface 401 functionality which may provide an interface towards the first peer 100. The server 400 may also provide a second client interface 402 functionality which may provide an interface towards the second peer 200-1, 200-2, 200-3. First and second client interface 401, 402 may include an access interface, like a web page, and a related protocol stack and an application functionality. Said application functionality may, for example, allow for offering a service, selecting a service, billing, and/or analysis or the like.

The first control unit 16 may provide a first identifier 101 depending on the selected service 410-1, 410-2 or 410-3. For example it is possible to provide always the same first identifier 101 if the same service 410-1, 410-2 or 410-3 is selected. If a different service 410-1, 410-2 or 410-3 is selected, a different first identifier 101 may be provided. It is also possible to provide, independent from the selection, always a new first identifier 101 which has not been provided before. This functionality may be configurable, for example by the first peer 100 via the user interface provided by the first control unit 16.

A service may be considered as different from another service, if, for example, the second peer 200 providing the service is different or, for example, the type of service is different. A type of service may for example concern a type of a medical service, like cardiology or neurology or the like, or also a legal service, for example tax law or labour law, consulting services or, for example, procurement services. Whether a type of service is different from the type of another service may be a subjective decision, for example depending on a definition made by the first peer 100 and/or the second peer 200.

It is possible that always the same second identifier 201 is used. That is, the second peer 200-1 may always use a same second identifier 201-1 (not depicted), the second peer 200-2 may always use a same second identifier 201-2 (not depicted) and/or the third peer 200-3 may always use a same second identifier 201-3 (not depicted). This may, for example, be beneficial for offering a service. For example, it may be possible to distinguish a service 410-1, 410-2 or 410-3 from the second identifier 201-1, 201-2 or 201-3, respectively. The second identifier 201-1, 201-2, 201-3 may be provided, for example, to aid in selecting a service 410-1, 410-2, 410-3, for example via the client interface 401.

FIG. 5 may be used to illustrate, for example, a use of the communication assembly 1 in a medical treatment, where, for example, the first peer 100 may be a patient and the second peer 200, for example, may be a doctor. Different second peers 200-1, 200-2 or 200-3 may correspond to different doctors.

FIG. 5 may be used to illustrate, for example, a use of the communication assembly 1 for a legal consultancy, where, for example, the first peer 100 may be a client and the second peer 200, for example, may be an attorney. Different second peers 200-1, 200-2 or 200-3 may correspond to different attorneys.

FIG. 5 may be used to illustrate, for example, a use of the communication assembly 1 for a procurement, where, for example, the first peer 100 may be a client and the second peer 200, for example, may be a supplier. Different second peers 200-1, 200-2 or 200-3 may correspond to different suppliers.

The communication assembly 1 may, for example, also be used as a communication assembly 1 for a job interview, where, for example, the first peer 100 may be a candidate and the second peer 200, for example, may be human resources staff member or vice versa. In order to provide equal chances to all candidates 100, it may be possible to anonymize the facial data in the video data of the candidate 100 according to an identity profile, for example provided by the company searching for staff. The identity profile may, for example, include a set of identification features each having a characteristic. For example, a candidate may be provided with the identity profile of the searching company in order to make use thereof during the interview, that is, using the profile to set the characteristic of the identity feature 50*a* of the first quantized peer 110 during the interview.

FIG. 6 shows a control flow diagram of a communication method. The communication method comprises the steps S610: capturing, by a first capturing unit 10, video data of a first peer 100 in real-time;

S611: modifying the video data captured by the first capturing unit 10 by replacing a characteristic of an identification feature 50 in the video data of the first peer 100 with a characteristic of a corresponding identification feature 50*a* of a first quantized peer 110 to complicate or prevent a correctly identifying of the first peer 100 from the identification feature 50*a* while substantially maintaining a characteristic of a mimic expression feature 51 in the video data of the first peer 100;

S612: performing a transfer of modified video data captured by the first capturing unit 10 to a second display unit 21;

S620: capturing, by a second capturing unit 20, video data of a second peer 200 in real-time;

S622: performing a transfer of video data captured by the second capturing unit 20 to a first display unit 11.

It is conceivable that the steps S610, S611 and S612 are performed parallel to the steps S620 and S622.

It is appreciated that the above examples are illustrative and not limiting and may, for example, be deliberately combined.

LIST OF REFERENCE NUMERALS

1 communication assembly
10 first capturing unit
11 first display unit
12 first anonymization unit
13 first selector
13*a* rectangular region
14 first authentication unit
15 first cryptography unit
16 first control unit
20 second capturing unit
21 second display unit
22 second anonymization unit
23 second selector
24 second authentication unit
25 second cryptography unit
26 second control unit
30 data transfer unit
50 identification feature of the first peer
50*a* identification feature of the first quantized peer
51 mimic expression feature

40 data transfer unit
100 first peer
101 first identifier
110 first quantized peer
200 second peer
201 second identifier
210 second quantized peer
300 third peer
301 communication identifier
400 server
401 first client interface
402 second client interface
410 service

The invention claimed is:

1. A Communication assembly comprising:
a first capturing unit configured to capture video data of a first peer in real-time, wherein the first peer corresponds to a first human being, wherein the video data captured by the first capturing unit includes video facial data of the first peer, and wherein the video facial data of the first peer comprises an identification feature suitable for an identification of the first peer and a mimic expression feature suitable for a non-verbal communication originating from the first peer;
a second capturing unit configured to capture video data of a second peer in real-time, wherein the second peer corresponds to a second human being;
a first anonymization unit configured to modify the video data captured by the first capturing unit in real-time by replacing a characteristic of the identification feature in the video facial data of the first peer with a characteristic of a corresponding identification feature of a first quantized peer to complicate or prevent a correctly identifying of the first peer from the identification feature while substantially maintaining a characteristic of the mimic expression feature in the video data of the first peer;
a first display unit of the first peer, the first display unit configured to receive and to display video data in real-time;
a second display unit of the second peer, the second display unit configured to receive and to display video data in real-time; and
a data transfer unit configured to:
perform a transfer of the video data modified by the first anonymization unit to the second display unit; and
perform a transfer of the video data captured by the second capturing unit to the first display unit.

2. The Communication assembly according to claim 1, comprising:
a first selector configured to select a portion of the video data and wherein the first anonymization unit is configured to perform a portion specific replacement of the characteristic of the identification feature in the video data of the first peer with the corresponding characteristic of the identification feature of the first quantized peer.

3. The Communication assembly according to claim 1, wherein the video data captured by the second capturing unit includes video facial data of the second peer wherein the video facial data of the second peer comprises an identification feature suitable for an identification of the second peer and a mimic expression feature suitable for a non-verbal communication originating from the second peer and wherein the communication assembly further comprises:
a second anonymization unit configured to modify the video data captured by the second capturing unit in real-time by replacing a characteristic of the identification feature in the video data of the second peer with a characteristic of a corresponding identification feature of a second quantized peer to complicate or prevent a correctly identifying of the second peer from the identification feature while substantially maintaining a characteristic of the mimic expression feature in the video data of the second peer, wherein the data transfer unit is configured to perform a transfer of the video data modified by the second anonymization unit to the first display unit.

4. The Communication assembly according to claim 3, comprising:

a second selector configured to select a portion of the video data of the second peer and wherein the second anonymization unit is configured to perform a portion specific modification of the characteristic of the identification feature in the video data of the second peer with the corresponding characteristic of the identification feature of the second quantized peer.

5. The Communication assembly according claim 1, comprising:

a first control unit configured to provide a first identifier assigned to the first peer, the first identifier configured to label the video data captured by the first capturing unit; and a second control unit configured to provide a second identifier assigned to the second peer, the second identifier configured to label the video data captured by the second capturing unit.

6. The Communication assembly according to claim 5, wherein the first identifier is assigned permanently and/or the second identifier is assigned permanently.

7. The Communication assembly according to claim 5, comprising:

a communication identifier configured to label the video data transferred from the first capturing unit to the second display unit and the video data transferred from the second capturing unit to the first display unit.

8. The Communication assembly according to claim 7, wherein the communication identifier is provided to a third peer and wherein the third peer is configured to at least one of collect, store, organize, or analyze the video data labeled with the communication identifier.

9. The Communication assembly according to claim 7, wherein the communication identifier is derived exclusively from the first identifier and the second identifier.

10. The Communication assembly according to claim 1, further comprising:

a first authentication unit configured to authenticate the video data of the first peer; and a second authentication unit configured to authenticate video data of the second peer.

11. The Communication assembly according to, claim 1, further comprising:

a first cryptography unit configured to encrypt video data captured by the first capturing unit and decrypt video data to be displayed by the first display unit; and a second cryptography unit configured to encrypt video data captured by the second capturing unit and decrypt video data to be displayed by the second display unit.

12. A communication system for audio-visual communication including a communication assembly, the communication assembly comprising:

a first capturing unit configured to capture video data of a first peer in real-time, wherein the first peer corresponds to a first human being, wherein the video data captured by the first capturing unit includes video facial data of the first peer, and wherein the video facial data of the first peer comprises an identification feature to identify the first peer and a mimic expression feature for a non-verbal communication originating from the first peer;

a second capturing unit configured to capture video data of a second peer in real-time, wherein the second peer corresponds to a second human being;

a first anonymization unit configured to modify the video data captured by the first capturing unit in real-time by replacing a characteristic of the identification feature in the video facial data of the first peer with a characteristic of a corresponding identification feature of a first quantized peer to complicate or prevent a correctly identifying of the first peer from the identification feature while substantially maintaining a characteristic of the mimic expression feature in the video data of the first peer;

a first display unit of the first peer, the first display unit configured to receive and to display video data in real-time;

a second display unit of the second peer, the second display unit configured to receive and to display video data in real-time; and a data transfer unit configured to:

perform a transfer of the video data modified by the first anonymization unit to the second display unit; and perform a transfer of the video data captured by the second capturing unit to the first display unit.

13. A Communication method, wherein the communication method comprises:

capturing, by a first capturing unit, video data of a first peer in real-time;

capturing, by a second capturing unit, video data of a second peer in real-time;

modifying the video data captured by the first capturing unit by replacing a characteristic of an identification feature in the video data of the first peer with a characteristic of a corresponding identification feature of a first quantized peer to complicate or prevent a correctly identifying of the first peer from the identification feature while substantially maintaining a characteristic of a mimic expression feature of the first peer;

performing a transfer of modified video data captured by the first capturing unit to a second display unit; and performing a transfer of video data captured by the second capturing unit to a first display unit.

14. The communication method according to claim 13, comprising:

assigning a first identifier to the first peer and labelling, with the first identifier, the video data captured by the first capturing unit; and assigning a second identifier to the second peer and labelling with the second identifier the video data captured by the second capturing unit.

15. The communication method according to claim 14, comprising:

deriving a communication identifier from the first identifier and the second identifier;

providing the communication identifier to a third peer;

providing the video data transferred from the first capturing unit to the second display unit and the video data transferred from the second capturing unit to the first display unit to the third peer;

labelling with the communication identifier the video data transferred from the first capturing unit to the second display unit and the video data transferred from the second capturing unit to the first display unit and, by the third peer, at least one of, collecting, storing, organizing, or analyzing the video data labelled with the communication identifier;

modifying the video data captured by the second capturing unit by replacing a characteristic of an identification feature in the video data of the second peer with a characteristic of a corresponding identification feature of a second quantized peer to complicate or prevent a correctly identifying of the second peer from the identification feature while substantially maintaining a characteristic of a mimic expression feature in the video data of the second peer and transferring the modified video data captured by the second capturing unit to the first display unit;

selecting a portion of the video data of the first peer captured by the first capturing unit and performing a portion specific replacement of the characteristic of an identification feature in the video data of the first peer with the corresponding characteristic of the identification feature of the first quantized peer (110);

selecting a portion of the video data of the second peer captured by the second capturing unit and performing a portion specific replacement of the characteristic of an identification feature in the video data of the second peer with the corresponding characteristic of the identification feature of the second quantized peer;

making the assignment of the second identifier permanent;

making the assignment of the first identifier permanent;

authenticating the video data of the first peer;

authenticating the video data of the second peer;

encrypting video data captured by the first capturing unit and/or the second capturing unit; and decrypting video data to be displayed by the first display unit and/or the second display unit.

16. The communication system of claim 12, wherein the communication assembly includes:

a first selector configured to select a portion of the video data, wherein the first anonymization unit is configured to perform a portion specific replacement of the characteristic of the identification feature in the video data of the first peer with the corresponding characteristic of the identification feature of the first quantized peer; and a second selector configured to select a portion of the video data of the second peer, wherein the second anonymization unit is configured to perform a portion specific modification of the characteristic of the identification feature in the video data of the second peer with the corresponding characteristic of the identification feature of the second quantized peer.

\* \* \* \* \*